United States Patent [19]

Ishida et al.

[11] Patent Number: 4,608,879

[45] Date of Patent: Sep. 2, 1986

[54] CHANGE SPEED OPERATING APPARATUS FOR A TRACTOR

[75] Inventors: Mikio Ishida; Shoso Ishimori, both of Sakai; Hagime Nakamura, Kawachinagano; Kenzo Ushiro, Sakai, all of Japan

[73] Assignee: Kubota, Ltd., Osaka, Japan

[21] Appl. No.: 649,590

[22] Filed: Sep. 12, 1984

[30] Foreign Application Priority Data

May 18, 1984 [JP] Japan .................... 59-73392

[51] Int. Cl.[4] .......................... G05G 1/14; G05G 5/16; G05G 11/00
[52] U.S. Cl. ........................................ 74/474; 74/481; 74/512; 74/531
[58] Field of Search ................. 74/474, 478, 481, 482, 74/512, 513, 531

[56] References Cited

U.S. PATENT DOCUMENTS

| 3,002,397 | 10/1961 | Shane et al. | 74/482 |
| 3,040,596 | 6/1962 | Shane et al. | 74/513 X |
| 3,313,174 | 4/1967 | Walker et al. | 74/474 |
| 4,059,025 | 11/1977 | Waack et al. | 74/513 X |
| 4,341,129 | 7/1982 | Bando | 74/474 X |

FOREIGN PATENT DOCUMENTS 56-19124 2/1981 Japan ..................... 74/474

Primary Examiner—Allan D. Herrmann
Attorney, Agent, or Firm—Edwin E. Greigg

[57] ABSTRACT

A change speed operating apparatus for a tractor comprises an oil hydraulic stepless change speed device, a change speed pedal for operating the device, a change speed operating mechanism for connecting both of the device and the pedal, a neutral return mechanism for urging the change speed operating mechanism into a neutral position, a speed setting mechanism and permissible means for permitting an independent movement of the change speed operating mechanism in a direction of acceleration to forward traveling.

9 Claims, 7 Drawing Figures

CHANGE SPEED OPERATING APPARATUS FOR A TRACTOR

BACKGROUND OF THE INVENTION

The present invention relates to a change speed operating apparatus for a tractor which comprises an oil hydraulic stepless change speed device, a change speed pedal for operating the oil hydraulic stepless change speed device, a change speed operating mechanism for connecting the oil hydraulic stepless change speed device and the change speed pedal mechanically, a neutral return mechanism for urging the change speed operating mechanism to return to a neutral position, a speed setting mechanism adapted for preventing the change speed operating mechanism from returning to a neutral position thereof from a desired operated position and for releasing prevention of the returning to the neutral position.

Normally, the above-mentioned speed setting mechanism is precisely connected to the change speed operating mechanism via rods and other elements without occurring play with connecting portions of the rods and each of the mechanisms so as to surely transmit the amount of the speed setting operation to the change speed operating mechanism.

The above change speed operating mechanism aims at operating the tractor at a constant speed while working and also at solving a trouble that a driver has to keep stepping the change speed pedal. However, it sometimes needs to accelerate the tractor from a constant speed for a short time while working. For instance, such is the case that a working load increases due to hard soil while cultivating the soil by means of a plow. In this case, since the above speed setting mechanism is provided only with limitted functions of keeping the amount of a speed setting operation and releasing the set position thereof, the driver has to step the change speed pedal to accelerate to get a desired speed after releasing the set position of the speed setting mechanism and thereafter decreasing the speed, the drive has to reset the speed setting mechanism. Thus, it is necessary to take many and complex steps in operation. This further means that a spare time is necessary to reset the speed setting mechanism at the previously set speed after the acceleration.

SUMMARY OF THE INVENTION

In view of the above-mentioned circumstances, the present invention has an object to provide a change speed operating apparatus for a tractor which may carry out an accelerating operation simply by rational improvement in construction without losing functions of the speed setting mechanism and automatically reset the speed setting mechanism at the previously set traveling speed after the acceleration.

The change speed operating apparatus for a tractor according to the present invention comprises an oil hydraulic stepless change speed device, a change speed pedal for operating the oil hydraulic stepless change speed device, a change speed operating mechanism for connecting the oil-hydraulic stepless change speed device and the change speed pedal mechanically, a neutral return mechanism for urging the change speed operating mechanism to return to a neutral position, a speed setting mechanism adapted for preventing the change speed operating mechanism from returning to a neutral position thereof from a desired operated position and releasing the prevention of the returning to the neutral position, and permissible means disposed between the change speed operating mechanism and the speed setting mechanism to permit an independent action of the change speed operating mechanism in a direction of acceleration of forward traveling speeds.

Namely, when the tractor is moving and a speed is once set by means of the speed setting mechanism, since the above-mentioned permissible means is provided, the change speed operating mechanism is limitted by the end of the permissible means to operate the tractor at the set speed though the change speed operating mechanism is urged to return to its neutral position, namely in the direction of deceleration. When it is desired to accelerate the tractor from the set speed, it is possible to speed up in proportion to the desired amount of operation of the change speed pedal by stepping same on the side of acceleration since the change speed operating mechanism is permitted to work by means of the permissible means. Further, the change speed pedal is released after the acceleration, the change speed operating mechanism is automatically operated to deceleration by means of a housed urging force in the direction of deceleration and return to and stops at the previously set speed position.

Thus, the present invention enables one to provide the change speed operating apparatus in which function of the speed setting mechanism is not lost by limitation of the end of permissible means and it is simply carried out with pedal operation to accelerate the tractor from the set speed due to permission of operation of the permissible means and since the pedal after acceleration may return to the set position by an urging force which is installed originally, and further deceleration after the acceleration may be obtained with simple operation of releasing the pedal so that the accelerated speed may return to the previously set speed.

Other advantages of the present invention will be apparent from the following description.

BRIEF DESCRIPTION OF THE DRAWINGS

The drawings show an embodiment of a change speed operating apparatus for a tractor in which.

DESCRIPTION OF THE PREFERRED EMBODIMENTS

Figure 1:
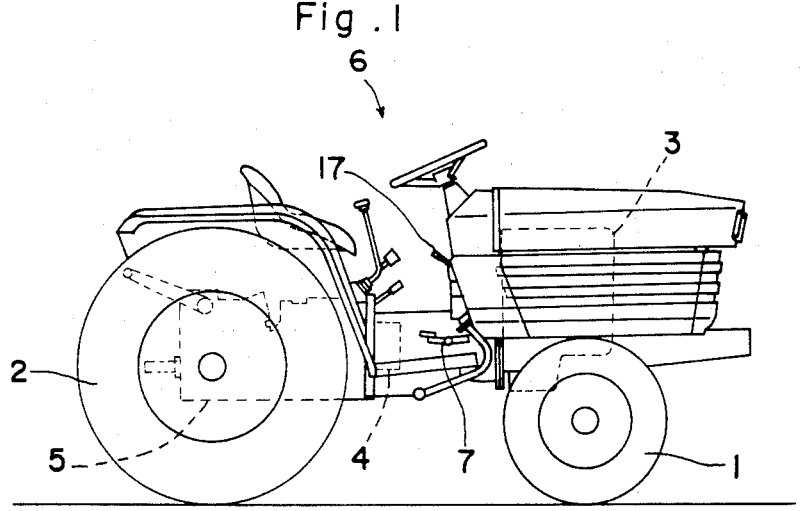
FIG. 1 shows a side view of permissible means where a change speed pedal is operated forward.

As shown in FIG. 1, a tractor comprises a pair of right and left front steering wheels 1 and rear driven wheels 2, both being mounted on a tractor body, an engine 3 disposed at the front portion of the body, an oil pressure stepless change speed device 4 arranged almost in the mid portion thereof, and a transmission case 5 disposed rearwardly of the device 4.

A driving section 6 is disposed in the mid of the tractor body and a change speed pedal 7 for operating the change speed device 4 is arranged on the right side of the tractor body so that a traveling speed and direction of the tractor may be obtained desirably by stepping operation by a driver.

Figure 2:
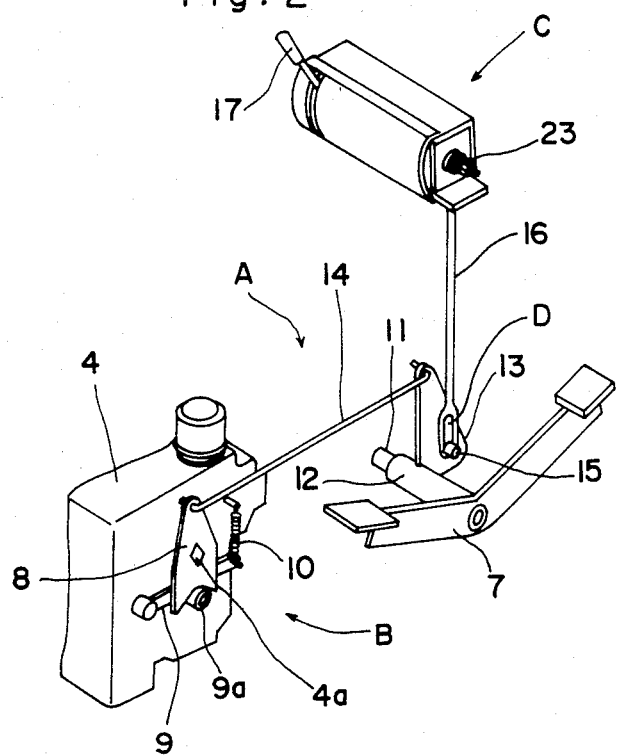
FIG. 2 shows a view corresponding to FIG. 1 after a speed setting mechanism is operated.

As shown in FIG. 2, the change speed pedal 7 is connected mechanically to the change speed device 4 via a change speed operating mechanism A. Connected to the change speed operating mechanism A are a neutral returning mechanism B for returning the change speed operating mechanism A into its neutral position and a speed setting mechanism C for preventing return from a desired operation position of the operating mechanism A to its neutral position or releasing the action of return. Interposed between the change speed operating mechanism B and the speed setting mechanism C is permissible means D which permits an independent action of the change speed operating mechanism B in the direction of acceleration for forward traveling.

The oil pressure stepless change speed device 4 is so constructed as to enable stepless change speeds of the output by rotational operation of an operating axis 4a and a cam member 8 is secured to the operating axis 4a. The cam member 8 has at the bottom thereof a cam surface which is formed to be pushed up in contact with a contacting member 9a so as to put it in its neutral position and the contacting member 9a is secured to a swing arm 9 which is urged upwardly by means of a spring 10. The change speed pedal 7 is mounted swingably on a support axis 11, which is secured to the tractor body, via a boss member 12 and to the boss member 12 a swing member 13 is secured. The swing member 13 and the cam member 8 are operatively connected by provision of a rod 14 which is bridging both the members 13 and 8 and the relationship therebetween is set to operate the tractor forwardly at a speed corresponding to the amount of forwardly stepping the pedal 7 and also stepping same rearwardly and then the tractor is traveled rearwardly at a speed corresponding to the amount of the pedal when the pedal is stepped rearwardly. It is called the speed change operating mechanism A which comprises the cam member 8, the rod 14 and the swing member 13 and also it is called the neutral return mechanism B which comprises the cam member 8, the contacting member 9a, the swing arm 9, and the spring 10.

Figure 3:
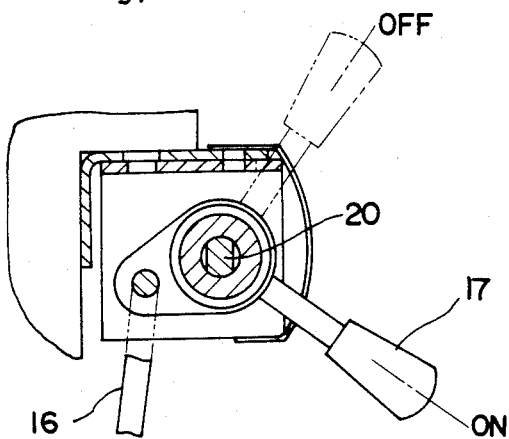
FIG. 3 shows an overall side view of the speed setting mechanism.
Figure 4:
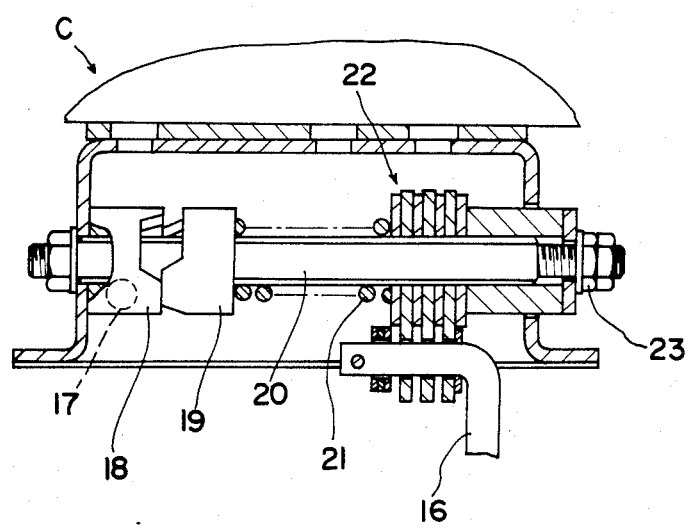
FIG. 4 is a perspective view showing a change speed operating mechanism.

A pin 15 projects from the swing member 13 and to the pin 15 a lower end of a rod 16 is secured via the permissible means D which comprises the elongated hole and to the upper end of the rod the speed setting mechanism C is disposed. As shown in FIGS. 3 and 4, the speed setting mechanism C is disposed at the operating section 6 and comprises an operating lever 17, two cams 18 and 19, a rotary shaft 20, a coil spring 21, a friction mechanism of multi-plate type 22 and a regulation nut 23 for friction pressure and so forth so as to be able to set a traveling speed of the tractor by fixing the rod 16 such that it does not move downwardly due to stepping the speed change pedal 7 forwardly.

Figure 5:
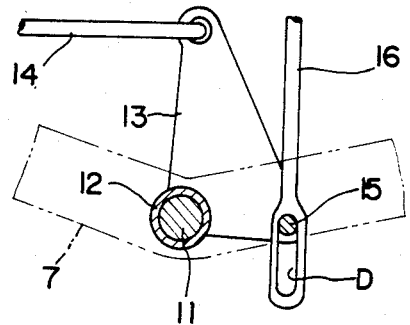
FIGS. 5 and 6 show respectively a sectional view of the speed setting mechanism.

When the operating lever 17 is in the off position, the spring 21 does not apply pressure onto the multiplate friction mechanism 22 which will permit lever 16 to be free to move with respect to the shaft 20. When the speed is set, the pedal 7 is moved forward which moves the cam 8 via the swing member 13 and rod 14. As the pedal 7 is moved forward, the rod 16 free falls against pin 15 and thusly moves downwardly as pedal 7 is moved forward. When the correct speed has been obtained by movement of pedal 7, the upped end of the slot D is against the pin 15, as shown in FIG. 5. At this time the speed setting operating lever 17 is moved to its on position. Moving operating lever 17 to its on position, forces the spring 21 against the friction plates 22 which locks rod 16 in place, as shown in FIGS. 3 and 5. Since the slot D in rod 16 rests upon the pin 15, the speed can be increased by movement of pedal 7 forward. When the original speed is again desired, the pedal 7 is released and will only move until the pin 15 rests against the upper end of slot D. Thus the speed of the tractor will return to the set speed and will remain at this speed until the setting of rod 16 is changed.

Since the elongated hole as the permissible means D is provided with the rod 16, it is permitted to step the pedal 7 forwardly so as to be able to accelerate the tractor from the set speed. The frictional force of the friction mechanism 22 is determined in such a grade that upward movement of the rod 16 is possible when the pedal 7 is stepped rearwardly and therefore it is possible to make a sudden stop with the operation of the pedal in the case of emergency while traveling.

Figure 6:
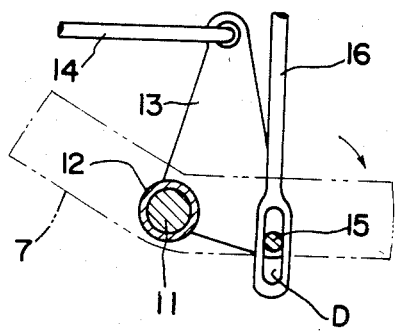

FIG. 5 shows a relationship between the elongated hole of the permissible means D and the pin 15 when the pedal 7 is set at a desired speed by means of the speed setting mechanism C. The pin 15 is in contact with the upper end of the elongated hole and is free in downward movement. Therefore, as shown in FIG. 6, it is possible to accelerate the tractor from the set speed.

Figure 7:
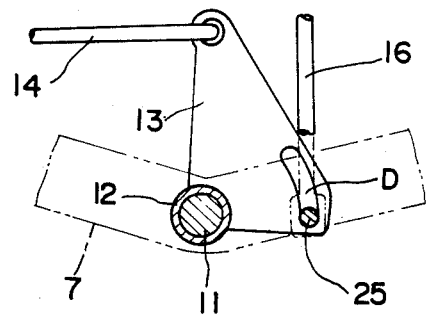
FIG. 7 is a view showing permissible means of another embodiment.

Although the permissible means D comprises an elongated hole formed with the lower end of the rod 16 in the abovementioned embodiment, in stead of this hole, it is possible to form an elongated hole of semicircle with the swing member 13 as shown in FIG. 7, and a pin 25 provided at the lower end of the rod 16 may be inserted into the semicircle hole. Further, the permissible means may be provided at an intermediate portion or an upper portion of the rod 16.

We claim:

1. A change speed operating apparatus for a tractor comprising:
   stepless change speed means;
   pedal means operatively connected to said change speed means for operating said change speed means;
   spring means for normally spring-loading said change speed means to a neutral position;
   speed setting means for setting said pedal means at selective operative positions thereof for permitting said stepless change speed means to be operated by said pedal means in a speed increasing direction from the lowest set speed position determined by each said operative position and for preventing said stepless change speed means for being operated by said pedal means in a speed decreasing direction from said speed position;
   friction lock means positioned selectively for frictionally locking said speed setting means at said operative positons and for releasing said speed setting means from said operative positions to permit said stepless change speed means to be freely operated by said pedal means.

2. The apparatus of claim 1 wherein
   said speed setting means set at the operative positions permits said change speed means to be operated by the pedal means in the speed decreasing direction when more than a preselected friction force of said friction lock means is exerted on the pedal means.

3. The apparatus of claim 1 wherein
said speed setting means includes a pivotal member secured to said pedal means so as to be pivotable therewith, a rod adapted to be frictionally locked in the operative positions thereof and to be released from the operative positions by said friction lock means, and engaging means operatively associated between said rod and pivotal member;
said engaging means being adapted to set said lowest speed position determined by each operative position of said rod.

4. The apparatus of claim 3 wherein
said engaging means comprises an elongated slot defined in said pivotal member and a pin secured to said rod, said pin being inserted in said elongated slot so as to be slidably moveable therein.

5. The apparatus of claim 3 wherein
said engaging means comprises an elongated slot defined in said rod and a pin secured to said pivotal member, said pin being inserted in said elongated slot so as to be slidably moveable therein.

6. A change speed operating apparatus for a tractor comprising:
stepless change speed means;
pedal means operatively connected to said stepless change speed means;
spring means for normally spring-loading said change speed means to a neutral position;
rod means adapted to be frictionally locked in selective operative positions thereof and to be released from said positions by means of a friction lock means;
engaging means operatively associated between said rod means and said pedal means;
said engaging means when said rod means is locked in said selective operative positions permits said stepless change speed means to be operated by said pedal means in a speed increasing direction from the lowest speed position set by each said operative position and prevents said stepless change speed means from being operated by said pedal means in a speed decreasing direction from said lowest speed position;
said engaging means when said rod means is released from said selective operative positions permits said stepless change speed means to be freely operated by said pedal means.

7. The apparatus of claim 6 wherein
said pedal means includes a pivotal member and said engaging means includes an elongated slot defined in said rod means and a pin secured to said pivotal member so as to be slidably moveable in said slot.

8. The apparatus of claim 7 wherein
said friction lock means comprises a shaft, friction plates rotatably mounted on said shaft and pivotally supporting said rod means, cam means mounted on said shaft, spring means arranged between said cam means and said friction plates, lever means for operating said cam means selectively to press said spring means so as to urge said friction plates for locking and releasing the friction plates and rod means freely rotatable downwardly by gravity until said rod means falls on said pin.

9. A change speed operating apparatus for a tractor comprising;
an oil hydraulic stepless change speed device,
a change speed pedal for operating the oil hydraulic stepless change speed device,
a change speed operating mechanism A for mechanically connecting between the oil hydraulic stepless change speed device and the change speed pedal, said change speed operating mechanism A comprises a cam member secured to an operating axis of the oil hydraulic stepless change speed device, a swing member secured integrally to the change speed pedal, and a rod operatively connecting the cam member and the swing member
a neutral return mechanism B for urging the change speed operating mechanism A to return to a neutral position,
a speed setting mechanism C adapted for preventing the change speed operating mechanism A from returning to a neutral position thereof from a desired operated position and for releasing said speed operating mechanism A for returning to the neutral position,
means D disposed between the change speed operating mechanism A and the speed setting mechanism C to permit an independent action of the change speed operating mechanism A in a direction of acceleration of forward traveling speeds, said means D comprises an elongated slot formed in a rod 16 with a pin inserted into the elongated slot with the rod 16 connected operatively to the speed setting mechanism C,
said speed setting mechanism C comprises an operating lever, two cams, a rotary shaft, a coil spring, a frictional mechanism of multi-plate type, and a regulation nut for friction pressure so as to be able to set a traveling speed of the tractor by fixing said rod 16 not to move downwardly due to stepping the speed change pedal 7 forwardly.

* * * * *